United States Patent Office 2,788,374
Patented Apr. 9, 1957

2,788,374

PROCESS FOR PREPARING DICHLORO-DIPHENYLDICHLOROETHANE

Robert H. Stair, Bellevue, Del., assignor to Allied Chemical & Dye Corporation, New York, N. Y., a corporation of New York No Drawing. Application November 24, 1953,
Serial No. 394,233

5 Claims. (Cl. 260—649)

This application relates to a method for preparing 1,1-bis(4-chlorophenyl)-2,2-dichloroethane, and more particularly to a method for preparing it from monochlorobenzene and mixtures of dichloroacetaldehyde and trichloroacetaldehyde (chloral).

1,1-bis(4-chlorophenyl)-2,2-dichloroethane is useful as an insecticide, and is more appropriate for combatting certain noxious organisms than is the well known 1,1-bis(4-chlorophenyl)-2,2,2-trichloroethane (DDT). For example, in mosquito control, dichlorodiphenyldichloroethane (which is the name for 1,1-bis(4-chlorophenyl)-2,2-dichloroethane recently approved by the Insecticide Division of the Department of Agriculture for use in the ingredient statements on labels, and which will be used hereinafter to designate this compound), has the advantage over DDT of being considerably less toxic to fish than is DDT and thus can be used without extensive fish damage in the treatment of waters infested with mosquito larvae. For this and other uses in which the presence of DDT may be objectionable, the dichlorodiphenyldichloroethane material should be relatively free from substantial proportions of DDT, and thus certain commercial specifications have been set to require that DDT be present in such products in amounts not exceeding 5%.

It is known to prepare 1,1-bis(4-chlorophenyl)-2,2-dichloroethane by the condensation of monochlorobenzene with dichloroacetaldehyde in the presence of a condensing agent such as concentrated sulfuric acid.

In the presence of dichloroacetaldehyde and condensing agents such as concentrated sulfuric acid, which also promote another reaction, such as sulfonation, monochlorobenzene may undergo two major, competing reactions, one of which results in its condensation with the dichloroacetaldehyde to form a dichlorodiphenyldichloroethane, the other of which results in its loss to the condensation reaction, for example, by sulfonation of the monochlorobenzene in the case of condensing agents such as sulfuric acid. Since the most effective condensing agents are usually those which tend to promote side reactions, particularly sulfonation, it is customary in preparing dichlorodiphenyldichloroethane (as is also the case in the preparation of DDT from trichloroacetaldehyde and monochlorobenzene) to use a large excess of monochlorobenzene, for example, a 25 to 30% or higher molar excess, to insure reaction of all the dichloroacetaldehyde, the more expensive of the two reactants, and to compensate for loss of monochlorobenzene as by sulfonation, which may take place to the extent of from about 5 to about 40 mol percent of the monochlorobenzene equivalent.

Dichlorodiphenyldichloroethane prepared from technical grades of dichloroacetaldehyde (which usually contain about 8-15% or more of trichloroacetaldehyde), by the usual procedures above described in which a large excess of monochlorobenzene is condensed with the technical dichloroacetaldehyde, have been found to contain relatively large quantities of DDT, often in excess of the permissible maximum in dichlorodiphenyldichloroethane for certain insecticidal uses.

The manufacture of pure dichloroacetaldehyde presents considerable difficulties, as this material is often prepared by the chlorination of ethyl alcohol or acetaldehyde in a process which yields chloral as an end product. The dichloroacetaldehyde product is obtained as an intermediate stage and it is difficult to stop the chlorination before appreciable quantities of chloral have been produced. Purifications of the resulting dichloroacetaldehyde-chloral mixtures, to eliminate the chloral, have been carried out but involve the difficulties and expense of such separations.

It is an object of the present invention to provide a process for preparing dichlorodiphenyldichloroethane by condensation of monochlorobenzene with mixed dichloroacetaldehyde and trichloroacetaldehyde (chloral), in which contamination of the resulting product with DDT is minimized.

A further object of the invention is to provide a process for preparing a dichlorodiphenyldichloroethane product low in DDT, by the condensation of monochlorobenzene with mixtures of dichloroacetaldehyde and chloral.

These and other objects are accomplished according to my invention wherein monochlorobenzene is condensed with dichloroacetaldehyde containing appreciable quantities of chloral, in the presence of a condensing agent such as concentrated sulfuric acid and in which the quantity of monochlorobenzene furnished is sufficient only to react preferentially with the dichloroacetaldehyde to the substantial exclusion of the chloral-chlorobenzene condensation.

The reaction proceeds as follows:

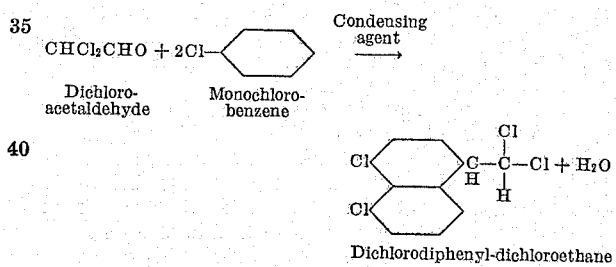

Dichlorodiphenyl-dichloroethane

My process is made possible by the discovery that condensation of chlorobenzene with dichloroacetaldehyde to dichlorodiphenyldichloroethane proceeds more readily than the condensation of chlorobenzene with chloral to DDT so that by limiting the quantity of monochlorobenzene available to react to an amount not appreciably in excess of its combining equivalent with the dichloroacetaldehyde in the mixed aldehydes, the DDT in the resulting product will be sharply minimized and will be substantially less than the expected amount which would otherwise be produced.

Thus, for example, when a technical grade of dichloroacetaldehyde containing about 9% or more by weight chloral is condensed with a 25%, or greater, available molecular excess of monochlorobenzene, more than 6% of DDT is produced in the condensed product. If however, the quantity of monochlorobenzene is limited to about the theoretical equivalent of the dichloroacetaldehyde present (plus only a sufficient excess to compensate for the quantity lost by sulfonation), the quantity of DDT in the resulting dichlorodiphenyldichloroethane product is reduced to below 5% usually to between about 1% and about 3%.

In carrying out the process of my invention, monochlorobenzene and a mixture of dichloroacetaldehyde and chloral are mixed in the ratio of not substantially more than two moles of monchlorobenzene to a quantity of the aldehyde mixture sufficient to furnish one mole of dichloroacetaldehyde. The mixture is then added preferably to cooled agitated condensing agent such as sulfuric acid, during which time, if sulfuric acid has been used, condensation occurs rapidly and some crystals form. The temperature rises slightly during the addition, but is maintained at not more than about 30° C., preferably between about 5° C. and about 15° C. When the reagents have been mixed, $SO_3$ or oleum is fed in at a rate sufficient to convert the water present and the water of reaction to sulfuric acid of 98–100% strength and cause completion of the condensation reaction. At the completion of the condensation reaction, the dichlorodiphenyldichloroethane product appears as a mass of solid pellets in the acid slurry. The pellets are removed from the acid, are neutralized and washed, preferably with hot water. The dichlorodiphenyldichloroethane oil is then separated from the wash water as by decantation and is dried.

The process of my invention may be carried out with mixtures of dichloroacetaldehyde and chloral containing the chloral in concentration up to about 25% by weight, and the presence of relatively small proportions of impurities such as underchlorinated products of the character obtained in the chlorination of ethyl alcohol or acetaldehyde in the manufacture of the crude dichloroacetaldehyde, does not appear to adversely affect the reaction. However, I prefer to carry out my process with dichloroacetaldehyde-chloral mixtures containing at least about 70% of dichloroacetaldehyde and not more than about 15% of chloral to obtain a resulting commercially adequate yield of a dichlorodiphenyldichloroethane product containing not more than about 5% preferably not more than about 3% of dichlorodiphenyltrichloroethane as contaminant. The resulting product has a purity such that its "set point" is at least about 86° C. as presently required by certain specifications for commercial dichlorodiphenyldichloroethane.

The crux of the invention as brought out above is to restrict the amount of monochlorobenzene to an amount only about equal to its combining equivalent with the quantity of dichloroacetaldehyde in the dichloro-trichloroacetaldehyde mixture plus not more than the excess required to compensate for the loss of monochlorobenzene by sulfonation. Smaller relative quantities of monochlorobenzene result in relatively smaller percentages of DDT in the final product, but, at proportions below the combining equivalent, yields also decline. Accordingly, I prefer to use proportions of monochlorobenzene not substantially in excess of mol equivalent ratios to the dichloroacetaldehyde actually present in the aldehyde mixtures, i. e. not more than about two moles of monochlorobenzene, plus the amount which will be lost to the reaction through sulfonation, and thence will be unavailable to react. The precise amounts used will depend on the degree of sulfonation to be expected, which in turn will depend on reaction conditions, including time of reaction, strength of condensing acid and particularly on temperature, higher temperatures tending to produce higher degrees of sulfonation under otherwise similar reaction conditions. Thus, for example, at a reaction temperature of 0° C. not more than about 5 percent sulfonation will usually occur, at reaction temperatures between about 5° C. and about 10° C., the amount of monochlorobenzene sulfonated is usually not more than about 10 mole percent; at 15° C. the amount of monochlorobenzene sulfonated may be as high as about 15 mole percent while at 20° C. sulfonation may take place to considerably higher extents. Accordingly, the quantity of monochlorobenzene used will be sufficient to provide, in a form available to react with the aldehyde mixture, not substantially in excess of about one mole equivalent of monochlorobenzene per mole of dichloroacetaldehyde in the mixture. When the indicated mol ratios are maintained, dichloroacetaldehyde-chloral mixtures of extremely high chloral content, for example, up to 25% or higher may be used without raising the DDT content in the resulting mixture appreciably above about 6%. Mixed aldehydes containing about 9–15% chloral or less usually produce a product containing not more than about 5% DDT usually smaller percentages.

The condensation reaction is carried out in a reaction medium containing, as catalyst, a liquid condensing agent such as sulfuric acid, chlorosulfonic acid, fluosulfonic acid, etc. and mixtures thereof. Sulfuric acid is preferred and will be used as illustrative throughout the description of the process of my invention. The reaction medium in which sulfuric acid is used as condensing agent may be formed in any suitable manner either by introducing the mixed organic reactants into water, or into aqueous or anhydrous sulfuric acid, and then adding sufficient oleum or sulfur trioxide to convert the water present in the reaction mixture, including the water of reaction, to substantially anhydrous sulfuric acid. While water alone or dilute aqueous sulfuric acid may be used as the initial reaction medium, I prefer to introduce the organic reactants into concentrated sulfuric acid, e. g. 93–99% $H_2SO_4$, during which time much of the condensation reaction takes place, then to add sufficient sulphur trioxide, for example, in the form of oleum, to convert water of reaction to sulfuric acid and thus to direct the reaction toward completion.

The quantity of sulfuric acid used as reaction medium is not critical but should be sufficient to form a convenient sized medium for the reaction, preferably providing a volume at least about equal to that of the organic reactants, usually between about 1.5 times and about 2.0 times the volume of organic materials.

The temperature of the reaction is not unduly critical, but, to prevent undue charring and sulfonation of the reactants, I prefer to maintain the reaction mixture at a temperature not appreciably in excess of about 15° C. during at least the early stages of the reaction, preferably at temperatures between about 5° C. and about 10° C.

The reaction rate is extremely rapid, so that the overall time of reaction is largely dependent on the ability to control undue temperature rise during mixing of reactants to prevent charring and side reactions.

The following specific examples further illustrate the invention. Parts are by weight except as otherwise noted.

EXAMPLES 1–8

A series of eight runs was made in which all conditions were identical except the quantity of monochlorobenzene used. These runs were carried out as follows: Mixtures were prepared of 113 parts of technical dichloroacetaldehyde (mol wt. DCA 113) (containing 83% of dichloroacetaldehyde and 9% chloral, the balance being lower chlorinated impurities), and monochlorobenzene varying in quantities from 191 to 259 parts. The mixtures of the two reactants were then added gradually and with agitation over a 10–15 minute period to 1,000 parts of 99% $H_2SO_4$ at 5° C. in a reactor. The temperature rose rapidly to 25–30° C. during addition of the organic mixture, indicating rapid condensation, and some crystals formed. Stirring and cooling were continued until the temperature returned to 5° C. when 375 parts of 20% oleum was fed into the reactor dropwise over a 2½–3 hour period, to convert the water of reaction to sulfuric acid. At the end of the oleum addition, an additional 2–2½ hour reaction time at 5° C. was allowed, to complete the condensation. At the end of the condensation, the dichlorodiphenyldichloroethane product appeared as a mass of solid pellets in the acid slurry. These pellets were filtered from the acid and the dichlorodiphenyldichloroethane was washed with 95° C. water, neutralized in hot $Na_2CO_3$ solution and given a final hot water wash after neutralization. The dichlorodiphenyldichloroethane product at this stage was an oil, and was separated from the wash water by decantation and was vacuum dried.

The quantity of monochlorobenzene used in the several runs varied from quantities equal to substantially the combining equivalent of the dichloroacetaldehyde actually present, to quantities equivalent to about 38% molecular excess. Data and results of the runs are given in Table 1 below, including the mole ratios of the reactants and the percent DDT in the product. If all the chloral in the charge had reacted to produce DDT the theoretical quantity of DDT produced would be about 8.6% of the resulting product.

It will be noted from the table that the run which provided a quantity of monochlorobenzene substantially equivalent to its combining weight with dichloroacetaldehyde, resulted in a dichlorodiphenyldichloroethane product containing only 1.45% of DDT, and that all runs in which the monochlorobenzene was present in proportions below about 1.15 mole equivalent of monochlorobenzene per mole of dichloroacetaldehyde resulted in products containing substantially less than about 5% DDT. Since the amount of sulfonation at the temperature used (5° C. except for a momentary rise to 30° C.) is low, probably considerably less than 15%, only a small quantity of monochlorobenzene over its combining weight was necessary in these cases.

*Table 1*

Set points of dichlorodiphenyldichloroethane and % DDT in product prepared from 113 parts of mixed dichloroacetaldehyde-chloral containing 83% DCA and 9% chloral, condensed with varying amounts of monochlorobenzene.

| Example No. | Parts by Weight | | | Mole Equivalents | | | | Set Point, °C. | Percent DDT in Product |
|---|---|---|---|---|---|---|---|---|---|
| | Tech DCA | MCB | Product | DCA | Chloral | MCB | Ratio, MCB/DCA | | |
| 1 | 113 | 259 | 284 | .83 | .069 | 1.15 | 1.385 | 86.1 | 6.75 |
| 2 | 113 | 236 | 289 | .83 | .069 | 1.05 | 1.265 | 86.4 | 4.9 |
| 3 | 113 | 236 | 280 | .83 | .069 | 1.05 | 1.265 | 87.2 | 5.75 |
| 4 | 113 | 214 | 273 | .83 | .069 | .95 | 1.144 | 87.4 | 3.1 |
| 5 | 113 | 214 | 280 | .83 | .069 | .95 | 1.144 | 87.5 | 4.15 |
| 6 | 113 | 203 | 270 | .83 | .069 | .90 | 1.084 | 88.4 | 2.5 |
| 7 | 113 | 203 | 264 | .83 | .069 | .90 | 1.084 | 88.2 | 2.25 |
| 8 | 113 | 191 | 255 | .83 | .069 | .85 | 1.024 | 89.2 | 1.45 |

EXAMPLES 9–11

A series of three runs was carried out in which dichloroacetaldehyde-chloral mixtures prepared by adding 10, 15 and 20% of additional chloral to the standard 113 part charge of technical dichloroacetaldehyde described in Examples 1–8, were reacted with 203 parts (1.8 moles) of chlorobenzene, the mole equivalent ratio of monochlorobenzene to dichloroacetaldehyde remaining the same in every run, that is 1.084. These runs were carried out using the same procedure as that described in Examples 1–8, with the results listed in Table 2 below.

EXAMPLE 12

113 parts of the technical grade dichloroacetaldehyde described in the foregoing examples was reacted with 203 parts of monochlorobenzene (a mole equivalent ratio of monochlorobenzene to dichloroacetaldehyde of 1.084), in sulfuric acid in the same manner as that described in the previous examples except that a shorter reaction time was provided. In this run, 1,000 parts of 99% $H_2SO_4$ was placed in a flask, agitated and cooled to 5° C. The monochlorobenzene and dichloroacetaldehyde were mixed and added in three portions to the sulfuric acid over a 15 minute span during which the temperature of the mixture rose to a maximum of 32° C. The mixture was cooled to 5° C. resulting in considerable crystallization. Then 266 parts of 20% oleum were added over a period of 80 minutes while agitating, and the charge was stirred for an additional 40 minutes after addition of oleum was complete, the total reaction time being about two and ½ hours. The resulting reaction product was removed from the acid slurry, washed, neutralized and dried. There resulted 264 parts of product, having a set-point of 88.4° C. and containing 2.35% DDT.

EXAMPLE 13

The run described below was carried out in a manner similar to those of the preceding examples except that water rather than 99% sulfuric acid was used as the inititial reaction medium to which the oleum condensing agent was added. In carrying out the condensation, 113 parts of technical dichloroacetaldehyde (83% DCA, 9% chloral) was mixed with 203 parts (.90 mole equivalent) of monochlorobenzene, and 18 parts of water was added to the mixture. 590 parts of 20% oleum were then introduced into the mixture slowly with stirring over a period of about four hours while maintaining the temperature between about 50° F. (10° C.) and about 60° F. (15.5° C.). The reaction mixture was then heated with steam to 179° F. (80.5° C.) to melt and separate the solid dichlorodiphenyldichloroethane product which rose to the top of the mass. It was allowed to solidify, and the acid was poured off. The product was washed, neutralized and dried. 264 parts of dichlorodiphenyldichloroethane product were obtained having a set point of 86.6° C. and containing 1.08% DDT.

EXAMPLES 14–18

A series of runs was made in a manner similar to those described in Examples 1–8, except that the reaction temperature was about 15–16° C. In these runs, three dichloroacetaldehyde-chloral mixtures were used, one containing 77.0% dichloroacetaldehyde and 11% chloral, one containing 75% dichloroacetaldehyde and 13%

*Table 2*

| Example No. | Parts by Weight | | | | Percent Composition of Aldehyde Mixture | | Mole Equivalents | | | Set Point, °C. | DDT Percent in Product |
|---|---|---|---|---|---|---|---|---|---|---|---|
| | MCB | Tech DCA | Added Chloral | Total Aldehydes | Chloral | DCA | MCB | DCA | Ratio, MCB/DCA | | |
| 9 | 203 | 113 | 11.3 | 124.3 | 17.2 | 75.4 | .9 | .83 | 1.084 | 87.5 | 6.0 |
| 10 | 203 | 113 | 17.0 | 130.0 | 20.9 | 72.1 | .9 | .83 | 1.084 | 85.6 | 5.9 |
| 11 | 203 | 113 | 22.6 | 135.6 | 24.1 | 69.0 | .9 | .83 | 1.084 | 84.7 | 5.65 |

The above runs illustrate strikingly that the preferential reaction of chlorobenzene with dichloroacetaldehyde persists even when mixed aldehydes containing high percentages of chloral are used in the reaction, and that, regardless of the percentage of chloral in the mixture, the DDT content of the resulting product is minimized by restriction of the monochlorobenzene as indicated, with chloral the other containing 71.8% dichloroacetaldehyde and 15.4% chloral. These mixtures were reacted with varying quantities of monochlorobenzene, and the set points and DDT contents of the resulting products were determined with the results shown in Table 3 below. At the temperature used in these runs, sulfonation of monochlorobenzene is considerable, as pointed out above, so that when molar excesses up to 39% monochlorobenzene were used, a product was obtained having a DDT content below the 5% limit set in commercial specifications indicating that very unsubstantial amounts of monochlorobenzene were available to react with the chloral present—Using a molar excess of 60% monochlorobenzene (Example 18), 8.75% DDT was found in the resulting product, indicating that considerable monochlorobenzene was available over that equivalent to the dichloroacetaldehyde in the mixture.

Table 3

| Example No. | Constitution of DCA, Chloral Mixture | | Mol Ratio, MCB:DCA | Product | |
|---|---|---|---|---|---|
| | Percent DCA | Percent Chloral | | Set Point, °C. | DDT, percent |
| 14 | 77.0 | 13.0 | 0.98:1 | 87.2 | 2.7 |
| 15 | 75.0 | 13.0 | 1.0:1 | 87.0 | 2.45 |
| 16 | 77 | 11.0 | 1.1:1 | 87.3 | 3.1 |
| 17 | 71.8 | 15.4 | 1.39:1 | 86.2 | 4.5 |
| 18 | 71.8 | 15.4 | 1.6:1 | 79.4 | 8.75 |

EXAMPLES 19–20

Two runs were carried out according to the procedure of Examples 1–8 which were similar in all respects, (including the quantity of reactants used), except in the temperature of reaction. Example 19 was carried out at temperature between 5° C. and 10° C.: Example 20 was carried out at a temperature of 15° C. Results of the runs, listed in Table 4 below shown that under these conditions, using a monochlorobenzene molar excess of 35%, the resulting product prepared at 5–10° C. had a DDT content of 6.25% since the extent of sulfonation was low and consequently considerable of the excess monochlorobenzene was available to react with the chloral. On the other hand, at 15° C. considerable of the excess monochlorobenzene became sulfonated, and thus to that extent was unavailable to react, hence the DDT content of the resulting product was considerably lower (2.65%).

Table 4

| Example No. | Constitution of DCA, Chloral Mixture | | Mol Ratio, MCB:DCA | Reaction Temp., °C. | Product | |
|---|---|---|---|---|---|---|
| | Percent DCA | Percent Chloral | | | Set Point, °C. | Percent DDT |
| 19 | 85 | 11 | 1.35:1 | 5–10 | 84 | 6.25 |
| 20 | 85 | 11 | 1.35:1 | 15 | 87 | 2.65 |

While the above describes the preferred embodiments of my invention, it will be understood that departures may be made therefrom within the scope of the specification and claims.

I claim:

1. In a process for preparing dichlorodiphenyldichloroethane by the condensation of monochlorobenzene and dichloroacetaldehyde, the step which comprises reacting, in the presence of a condensing agent, a mixture of dichloroacetaldehyde and trichloroacetaldehyde containing at least about 70% of dichloroacetaldehyde and in excess of about 8% but not more than about 25% of trichloroacetaldehyde, with quantity of monochlorobenzene sufficient to provide, in a form available to react with said mixture, not substantially in excess of one mole equivalent of monochlorobenzene per mole of dichloroacetaldehyde in the mixture.

2. In a process for preparing dichlorodiphenyldichloroethane by the condensation, in the presence of a sulfuric acid catalyst, of monochlorobenzene and dichloroacetaldehyde, the steps which comprise reacting a mixture of dichloroacetaldehyde and trichloroacetaldehyde containing at least about 70% of dichloroacetaldehyde and in excess of about 8% but not more than about 25% of trichloroacetaldehyde with a quantity of monochlorobenzene sufficient to provide, in a form available to react with said mixture, not substantially in excess of about one mole equivalent of monochlorobenzene per mole of dichloroacetaldehyde in the mixture.

3. In a process for preparing dichlorodiphenyldichloroethane by the condensation, in the presence of a sulfuric acid catalyst, of monochlorobenzene and dichloroacetaldehyde, the steps which comprise reacting a mixture of dichloroacetaldehyde and trichloroacetaldehyde, containing at least about 70% of dichloroacetaldehyde and in excess of about 8% but not more than about 15% of trichloroacetaldehyde, with a quantity of monochlorobenzene sufficient to provide, in a form available to react with said mixture, not substantially more than about one mole equivalent of monochlorobenzene per mole of dichloroacetaldehyde in the mixture, whereby a dichlorodiphenyldichloroethane product is produced containing not more than about 5% of DDT.

4. In a process for preparing dichlorodiphenyldichloroethane by the condensation, in the presence of a sulfuric acid catalyst, of monochlorobenzene and dichloroacetaldehyde, the steps which comprise reacting a mixture of dichloroacetaldehyde and trichloroacetaldehyde containing at least about 70% dichloroacetaldehyde and in excess of about 8% but not more than about 25% of trichloroacetaldehyde with a quantity of monochlorobenzene sufficient to provide, in a form available to react with said mixture, not substantially more than one mole equivalent of monochlorobenzene per mole of dichloroacetaldehyde in the mixture.

5. A process for preparing dichlorodiphenyldichloroethane which comprises preparing a mixture containing monochlorobenzene, and a mixture of dichloroacetaldehyde and trichloroacetaldehyde containing at least about 70% of dichloroacetaldehyde and in excess of about 8% but not more than about 25% of trichloroacetaldehyde, the molecular combining ratio of monochlorobenzene to dichloroacetaldehyde in said mixture being sufficient to provide, in a form available to react with said aldehyde mixture, not substantially more than one mole of monochlorobenzene per mole of dichloroacetaldehyde, introducing the said mixture into a concentrated sulfuric acid reaction medium, adding to the resulting reaction mass sufficient oleum to convert all the water present and formed in the reaction to sulfuric acid of about 99% concentration, and maintaining the reaction mass at a temperature not exceeding about 30° C. until the condensation reaction is substantially complete.

References Cited in the file of this patent

UNITED STATES PATENTS 2,464,600     Meitzner et al.     Mar. 15, 1949

FOREIGN PATENTS 902,871     France     Jan. 3, 1945